US010433227B2

(12) United States Patent
Fujishiro

(10) Patent No.: US 10,433,227 B2
(45) Date of Patent: Oct. 1, 2019

(54) BASE STATION AND WIRELESS LAN TERMINATION APPARATUS

(71) Applicant: KYOCERA CORPORATION, Kyoto (JP)

(72) Inventor: Masato Fujishiro, Yokohama (JP)

(73) Assignee: KYOCERA Corporation, Kyoto (JP)

(*) Notice: Subject to any disclaimer, the term of this patent is extended or adjusted under 35 U.S.C. 154(b) by 109 days.

(21) Appl. No.: 15/505,518

(22) PCT Filed: Aug. 20, 2015

(86) PCT No.: PCT/JP2015/073330
§ 371 (c)(1),
(2) Date: Feb. 21, 2017

(87) PCT Pub. No.: WO2016/031662
PCT Pub. Date: Mar. 3, 2016

(65) Prior Publication Data
US 2017/0272992 A1    Sep. 21, 2017

(30) Foreign Application Priority Data

Aug. 25, 2014  (JP) .................................. 2014-170816

(51) Int. Cl.
*H04W 4/00* (2018.01)
*H04W 36/14* (2009.01)
(Continued)

(52) U.S. Cl.
CPC .......... *H04W 36/14* (2013.01); *H04W 36/22* (2013.01); *H04W 36/38* (2013.01); *H04W 52/02* (2013.01);
(Continued)

(58) Field of Classification Search
USPC .... 370/230, 230.1, 252, 328, 329, 465, 466, 370/468, 311, 331
See application file for complete search history.

(56) References Cited

U.S. PATENT DOCUMENTS 9,674,772 B2 * 6/2017 Cho ...................... H04W 48/16
2012/0044915 A1 * 2/2012 Oerton .................. H04W 24/02
370/338
(Continued)

FOREIGN PATENT DOCUMENTS

EP       2739095 A4   3/2015
JP    2011-135147 A   7/2011
(Continued)

OTHER PUBLICATIONS

Catt, "RIM transport mechanism for inter-RAT energy saving," 3GPP TSG RAN WG3 Meeting #75bis, R3-120510, San Jose del Cabo, Mexico, Mar. 26-30, 2012, 4 pp.
(Continued)

*Primary Examiner* — Kwang B Yao
*Assistant Examiner* — Nguyen H Ngo
(74) *Attorney, Agent, or Firm* — Studebaker & Brackett PC

(57) ABSTRACT

A base station according to an embodiment comprises: a receiver configured to receive resource information indicating a usage status of radio resources of a node to which an energy saving mode in which consumed power is reduced by stopping a use of at least a part of radio resources is applied. The resource information includes identification information for identifying whether or not the usage status indicated by the resource information is a usage status of radio resources available when the energy saving mode is applied.

4 Claims, 7 Drawing Sheets

(51) Int. Cl.
*H04W 36/22* (2009.01)
*H04W 36/38* (2009.01)
*H04W 52/02* (2009.01)
*H04W 72/04* (2009.01)
*H04W 92/20* (2009.01)
*H04W 72/02* (2009.01)
*H04W 84/04* (2009.01)
*H04W 84/12* (2009.01)

(52) U.S. Cl.
CPC .......... *H04W 72/02* (2013.01); *H04W 72/04* (2013.01); *H04W 72/042* (2013.01); *H04W 72/0413* (2013.01); *H04W 92/20* (2013.01); *H04W 84/042* (2013.01); *H04W 84/12* (2013.01); *Y02D 70/00* (2018.01); *Y02D 70/1262* (2018.01); *Y02D 70/142* (2018.01); *Y02D 70/164* (2018.01); *Y02D 70/25* (2018.01)

(56) References Cited

U.S. PATENT DOCUMENTS

| | | | | |
|---|---|---|---|---|
| 2013/0058268 | A1* | 3/2013 | Kholaif | H04W 74/085 370/311 |
| 2014/0023013 | A1* | 1/2014 | Lee | H04W 28/24 370/329 |
| 2014/0135030 | A1 | 5/2014 | Wang et al. | |
| 2014/0248884 | A1 | 9/2014 | Asada | |
| 2014/0286159 | A1* | 9/2014 | Etemad | H04W 36/14 370/230 |
| 2014/0286326 | A1* | 9/2014 | Jang | H04W 4/02 370/338 |
| 2015/0215809 | A1* | 7/2015 | He | H04L 61/2038 370/338 |
| 2015/0282026 | A1* | 10/2015 | Gupta | H04W 76/14 370/331 |
| 2015/0334602 | A1* | 11/2015 | Hencinski | H04W 84/12 370/338 |
| 2016/0183147 | A1* | 6/2016 | Da Silva | H04W 36/0055 370/331 |
| 2016/0234851 | A1* | 8/2016 | Zhang | H04W 28/08 |
| 2017/0026960 | A1* | 1/2017 | Mestanov | H04W 72/0426 |
| 2017/0070923 | A1* | 3/2017 | Li | H04W 36/0066 |

FOREIGN PATENT DOCUMENTS

| | | |
|---|---|---|
| JP | 2013-093790 A | 5/2013 |
| WO | 2013/080409 A1 | 6/2013 |

OTHER PUBLICATIONS

3GPP TR 37.870 VO.2.0, 3rd Generation Partnership Project; Technical Specification Group Radio Access Network; Study on Multi-RAT joint coordination (Release 13), (May 2014), 15 pp.
Extended European Search Report dated Jan. 31, 2018, from corresponding EP Appl No. 15834956.3, 11 pp.
International Search Report issued in PCT/JP2015/073330; dated Nov. 2, 2015.
Written Opinion issued in PCT/JP2015/073330; dated Nov. 2, 2015.
3rd Generation Partnership Project; Technical Specification Group Radio Access Network; Evolved Universal Terrestrial Radio Access (E-UTRA); Potential solutions for energy saving for E-UTRAN; 3GPP TR 36.927 V11.0.0; Sep. 2012; pp. 1-22; Release 11; 3GPP Organizational Partners.
CHTTL; "On E-UTRAN Network Energy Saving"; 3GPP TSG RAN WG3 Meeting #70; Nov. 15-19, 2010; pp. 1-4; R3-103392; Jacksonville, USA.
An Office Action mailed by the Japanese Patent Office dated Dec. 26, 2017, which corresponds to Japanese Patent Application No. 2016-545464 and is related to U.S. Appl. No. 15/505,518; with English Concise Explanation.
Qualcomm Incorporated; Procedures and Signaling Flows between eNB and WT; 3GPP TSG-RAN WG3#89; R3-151460; URL:http://www.3gpp.org/ftp/tsg_ran/WG3_lu/TSGR3_89/Docs/R3-151460.zip; Aug. 15, 2015; 6 pages; Beijing, China.
Samsung; Discussion on CP of WLAN Aggregation; 3GPP TSG-RAN WG3#89; R3-151556; URL:http://www.3gpp.org/ftp/tsg_ran/WG3_lu/TSGR3_89/Docs/R3-151556.zip; Aug. 14, 2015; 8 pages; Beijing, China.

* cited by examiner

BASE STATION AND WIRELESS LAN TERMINATION APPARATUS

TECHNICAL FIELD

The present invention relates to a base station and a wireless LAN termination apparatus which are used in a mobile communication system.

BACKGROUND ART

There has been introduced an energy saving technique for reducing consumed power in a base station in the 3GPP (3rd Generation Partnership Project) as a standard project of the mobile communication systems (see Non-Patent Document 1, for example). For example, consumed power in the base station can be reduced by stopping the operation of a cell managed by the base station, that is, by stopping the use of the radio resources, during nighttime with less communication traffics.

In the meantime, in order to optimize the load balance between base stations, the base station may make the user terminal of its own station perform the handover to a neighbor base station. In this case, the base station can determine whether or not to cause the user terminal of its own station to perform the handover, based on resource information indicating the usage status of the radio resources received from the neighboring base station.

PRIOR ART DOCUMENT

Non-Patent Document

[Non Patent Document 1] 3GPP technique report "TR36.927 V11.0.0" Sep. 24, 2012

SUMMARY OF THE INVENTION

Here, it is assumed that the base station receives resource information from a neighboring base station having stopped using a part of radio resources in order to reduce power consumption. In this case, even when the base station receives the resource information from the neighboring base station, the base station does not understand whether an use situation indicated by the resource information indicates a use situation of usual radio resources before stopping using the part of radio resources or a use situation of radio resources available when the using the part of radio resources is stopped. Thereby, the base station may not be able to appropriately determine whether or not the base station causes a user terminal of its own satiation to perform a handover, and it is possible that one base station may be overloaded.

It is therefore an object of the present application to enable to appropriately reduce the load of the base station in a mobile communication system with energy saving technology introduced.

A base station according to an embodiment comprises a receiver configured to receive resource information indicating a usage status of radio resources of a node to which an energy saving mode in which consumed power is reduced by stopping a use of at least a part of radio resources is applied. The resource information includes identification information for identifying whether or not the usage status indicated by the resource information is a usage status of radio resources available when the energy saving mode is applied.

A base station (an eNB 200-1) according to an embodiment comprises: a transmitter configured to transmit, to a neighboring base station, resource information indicating a usage status of radio resources of the base station; and a controller configured to control an application of an energy saving mode in which consumed power is reduced by stopping a use of at least a part of radio resources. The transmitter is configured to transmit the information including identification information for identifying whether or not the usage status indicated by the resource information is a usage status of radio resources available when the energy saving mode is applied, when the energy saving mode is applied.

A wireless LAN termination apparatus (a WT 600) according to an embodiment is configured to manage a wireless LAN access point. The wireless LAN termination apparatus comprises: a controller configured to transmit, to a base station, resource information indicating a usage status of radio resources of the wireless LAN access point. The controller is configure to transmit the resource information to the base station when an energy saving mode in which consumed power is reduced by stopping a use of at least a part of radio resources is applied to the wireless LAN access point, and the resource information includes identification information for identifying whether or not the usage status indicated by the resource information is a usage status of radio resources available when the energy saving mode is applied.

DESCRIPTION OF THE EMBODIMENT

Figure 1:
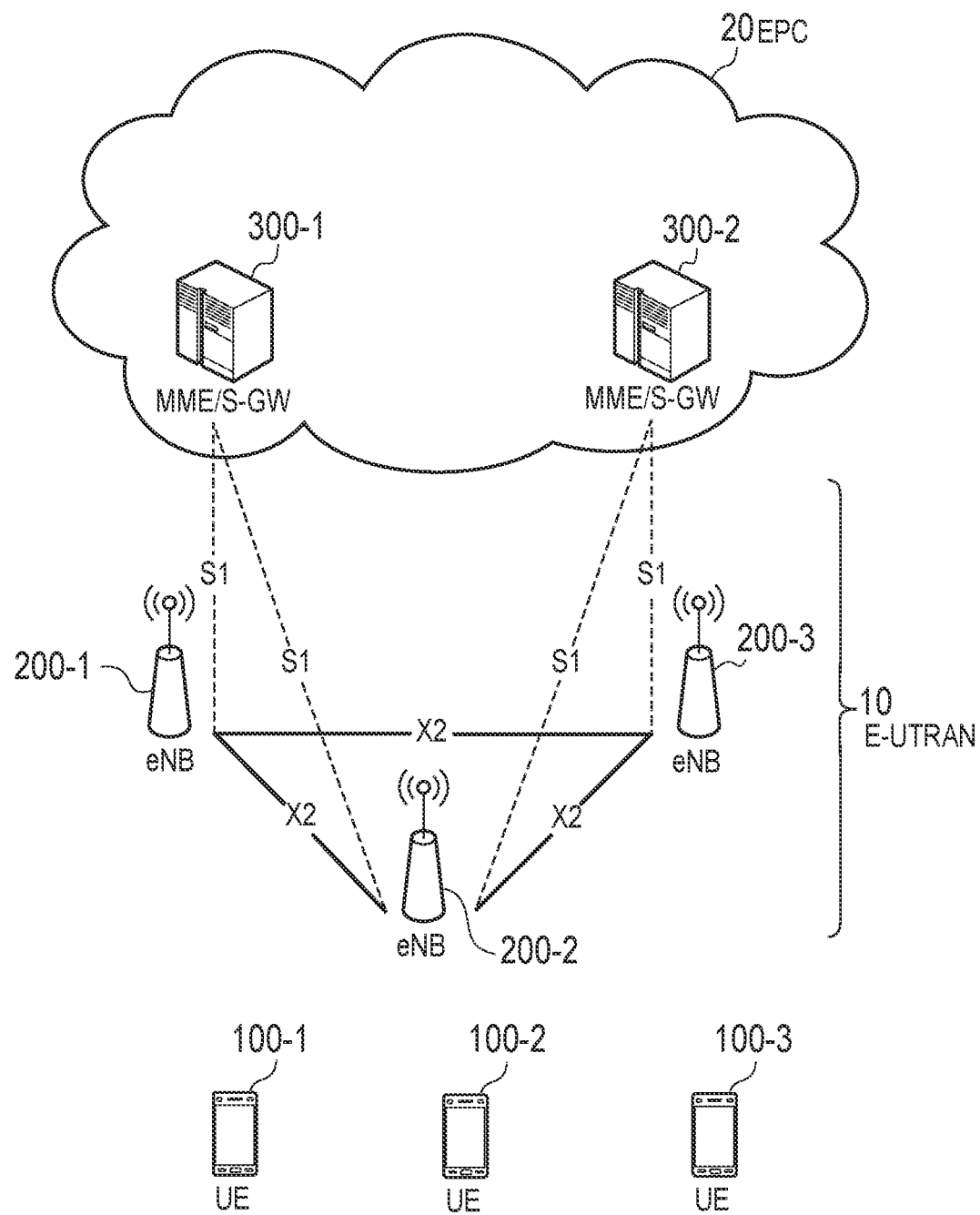
FIG. 1 is a configuration diagram of a LTE system according to a first embodiment.

A base station (an eNB 200-2) according to a first and a second embodiments comprises a receiver configured to receive resource information indicating a usage status of radio resources of a node to which an energy saving mode in which consumed power is reduced by stopping a use of at least a part of radio resources is applied. The resource information includes identification information for identifying whether or not the usage status indicated by the resource information is a usage status of radio resources available when the energy saving mode is applied.

In the first embodiment, it further comprises a controller configured to control causing a user terminal to perform a handover to a neighboring base station being the node, on a basis of the resource information.

In the first embodiment, the controller is configured to control transmitting, to the neighboring base station, a message requesting an increase in available radio resources in the neighboring base station before causing the user terminal to perform the handover when the energy saving mode is applied in the neighboring base station.

In the first embodiment, the message includes information on radio resources necessary to satisfy a quality of service requested by each of all user terminals performing the handover to the neighboring base station.

In the first embodiment, when the usage status indicated by the resource information is the usage status of radio resources available when the energy saving mode is applied, the resource information includes a usage rate of physical resource blocks calculated excluding physical resource blocks unavailable when the energy saving mode is applied.

In the first embodiment, when the usage status indicated by the resource information is the usage status of radio resources available when the energy saving mode is applied, the resource information includes a value obtained by correcting a value obtained by classifying each cell depending on radio resources available in each cell managed by the neighboring base station, depending on an amount of radio resources available when the energy saving mode is applied.

In the first embodiment, when the usage status indicated by the resource information is the usage status of radio resources available when the energy saving mode is applied, the resource information includes a value obtained by correcting a ratio of an available radio resource amount to a total radio resource amount depending on an amount of radio resources available when the energy saving mode is applied.

A base station (an eNB 200-1) according to a first embodiment comprises: a transmitter configured to transmit, to a neighboring base station, resource information indicating a usage status of radio resources of the base station; and a controller configured to control an application of an energy saving mode in which consumed power is reduced by stopping a use of at least a part of radio resources. The transmitter is configured to transmit the information including identification information for identifying whether or not the usage status indicated by the resource information is a usage status of radio resources available when the energy saving mode is applied, when the energy saving mode is applied.

A wireless LAN termination apparatus (a WT 600) according to a second embodiment is configured to manage a wireless LAN access point. The wireless LAN termination apparatus comprises: a controller configured to transmit, to a base station, resource information indicating a usage status of radio resources of the wireless LAN access point. The controller is configure to transmit the resource information to the base station when an energy saving mode in which consumed power is reduced by stopping a use of at least a part of radio resources is applied to the wireless LAN access point, and the resource information includes identification information for identifying whether or not the usage status indicated by the resource information is a usage status of radio resources available when the energy saving mode is applied.

First Embodiment (System Configuration)

FIG. 1 is a configuration diagram of an LTE system according to the present embodiment.

As shown in FIG. 1, the LTE system includes a plurality of UEs (User Equipments) 100, E-UTRAN (Evolved Universal Terrestrial Radio Access Network) 10, and EPC (Evolved Packet Core) 20. The E-UTRAN 10 and the EPC 20 configure a network.

The UE 100 is a mobile radio communication device and performs radio communication with a cell (a serving cell) with which a connection is established. The UE 100 corresponds to a user terminal.

The E-UTRAN 10 includes a plurality of eNBs 200 (evolved Node-Bs). The eNB 200 corresponds to a base station. The eNB 200 manages a cell and performs radio communication with the UE 100 which establishes a connection with the cell.

It is noted that the "cell" is used as a term indicating a minimum unit of a radio communication area, and is also used as a term indicating a function of performing radio communication with the UE 100.

The eNB 200, for example, has radio resources management (RRM) function, a function of routing user data, and a measurement control function for mobility control and scheduling.

The EPC 20 includes a plurality of MME (Mobility Management Entity)/S-GWs (Serving-Gateways) 300. The EPC 20 corresponds to a core network. The EPC 20 may include an OAM 400 (Operation and Maintenance).

The MME is a network node for making various mobility controls and the like for the UE 100 and corresponds to a controller. The S-GW is a network node that performs control to transfer user data and corresponds to a mobile switching center.

The eNBs 200 are connected mutually via an X2 interface. Further, the eNB 200 is connected to the MME/S-GW 300 via an S1 interface.

The OAM is a server apparatus managed by an operator, and maintains and monitor the E-UTRAN 10.

Next, the configurations of the UE 100 and the eNB 200 will be described.

Figure 2:
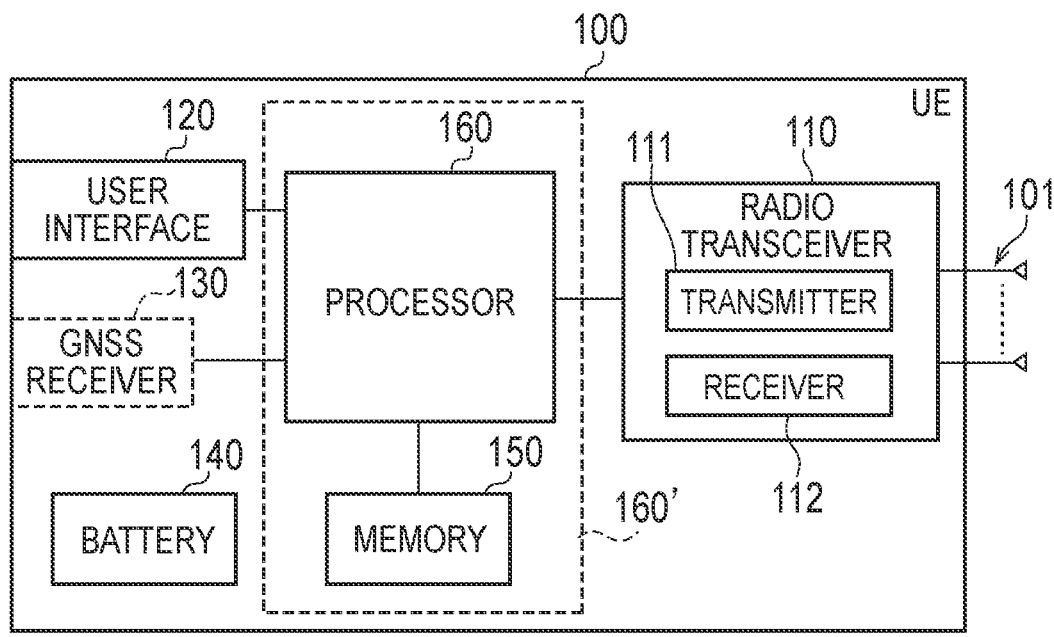
FIG. 2 is a block diagram of UE.

FIG. 2 is a block diagram of the UE 100. As shown in FIG. 2, the UE 100 includes a plurality of antennas 101, a radio transceiver 110, a user interface 120, a GNSS (Global Navigation Satellite System) receiver 130, a battery 140, a memory 150, and a processor 160. The memory 150 and the processor 160 configure a controller.

The UE 100 may not necessarily include the GNSS receiver 130. Further, the memory 150 may be integrally formed with the processor 160, and this set (that is, a chip set) may be called a processor 160'.

The plurality of antennas 101 and the radio transceiver 110 are used to transmit and receive a radio signal. The radio transceiver 110 includes a transmitter 111 configured to convert a baseband signal output from the processor 160 into the radio signal, and transmit the radio signal from the plurality of antennas 101. Further, the radio transceiver 110 includes a receiver 112 configured to convert the radio signal received by the plurality of antennas 101 into the baseband signal, and output the baseband signal to the processor 160.

The user interface 120 is an interface with a user carrying the UE 100, and includes, for example, a display, a microphone, a speaker, various buttons and the like. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor that performs modulation and demodulation, encoding and decoding and the like on the baseband signal, and a CPU (Central Processing Unit) that performs various processes by executing the program stored in the memory 150. The processor 160 may further include a codec that performs encoding and decoding on sound and video signals. The processor 160 executes various processes and various communication protocols described later.

Figure 3:
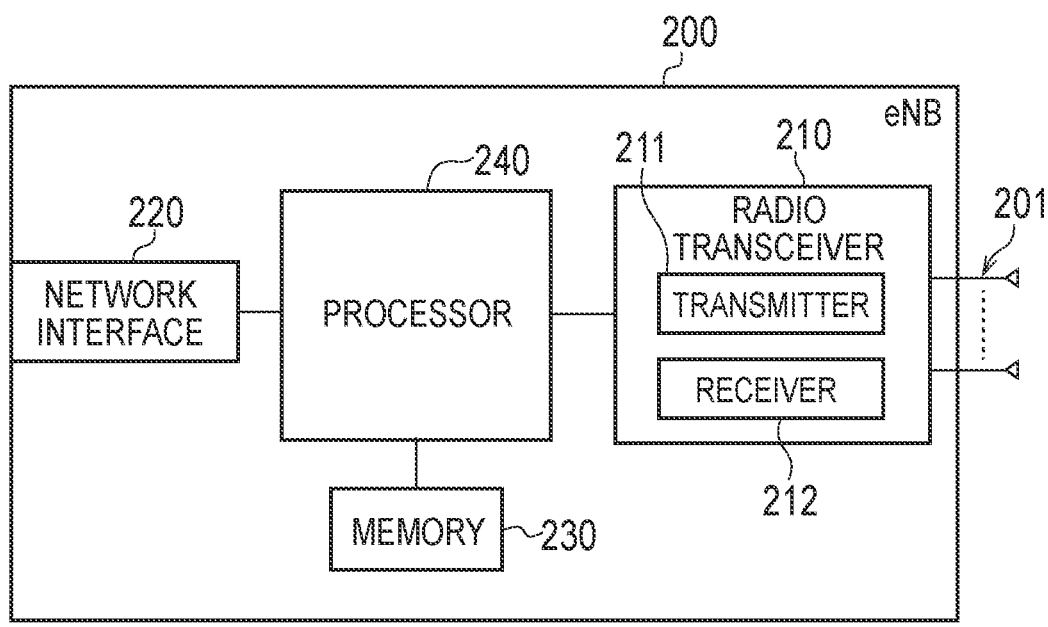
FIG. 3 is a block diagram of an eNB.

FIG. 3 is a block diagram of the eNB 200. As shown in FIG. 3, the eNB 200 includes a plurality of antennas 201, a radio transceiver 210, a network interface 220, a memory 230, and a processor 240. The memory 230 and the processor 240 configure a controller. It is noted that the memory 230 may be integrally formed with the processor 240, and this set (that is, a chipset) may be called a processor constituting a controller.

The plurality of antennas 201 and the radio transceiver 210 are used to transmit and receive a radio signal. The radio transceiver 210 includes a transmitter 211 configured to convert the baseband signal output from the processor 240 into the radio signal, and transmit the radio signal from the plurality of antennas 201. Further, the radio transceiver 210 includes a receiver 212 configured to convert the radio signal received by the plurality of antennas 201 into the baseband signal, and outputs the baseband signal to the processor 240.

The network interface 220 is connected to the neighboring eNB 200 via the X2 interface and is connected to the MME/S-GW 300 via the S1 interface. The network interface 220 is used in communication on the X2 interface and communication on the S1 interface.

The memory 230 stores a program to be executed by the processor 240 and information to be used for a process by the processor 240.

The processor 240 includes the baseband processor that performs modulation and demodulation, encoding and decoding and the like on the baseband signal and a CPU that performs various processes by executing the program stored in the memory 230. The processor 240 executes various processes and various communication protocols described later.

Figure 4:
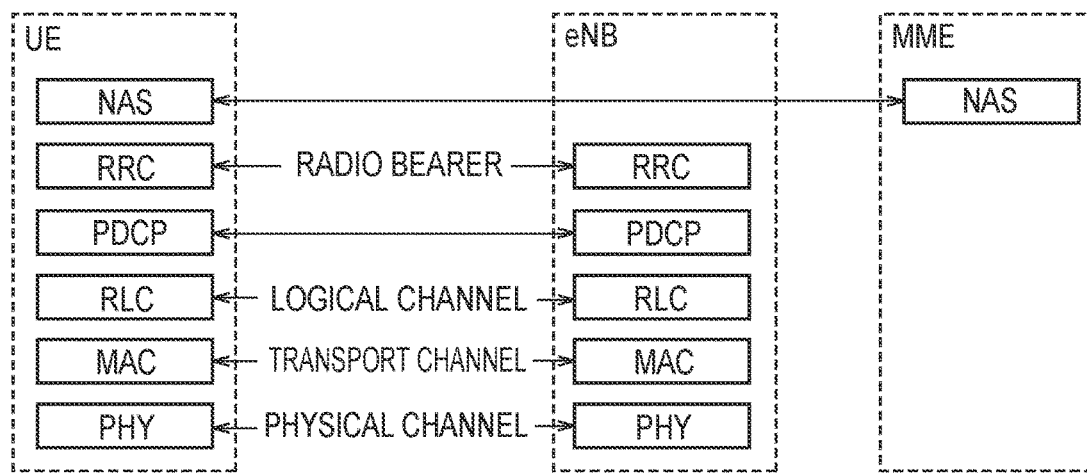
FIG. 4 is a protocol stack diagram of a radio interface in the LTE system.

FIG. 4 is a protocol stack diagram of a radio interface in the LTE system.

As shown in FIG. 4, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. The PHY layer provides a transmission service to the upper layer using the physical channel. Between the PHY layer of the UE 100 and the PHY layer of the eNB 200, data is transmitted via the physical channel.

The MAC layer performs priority control of data, and a retransmission process and the like by hybrid ARQ (HARQ). Between the MAC layer of the UE 100 and the MAC layer of the eNB 200, data is transmitted via a transport channel. The MAC layer of the eNB 200 includes a MAC scheduler for deciding a transport format of an uplink and a downlink (a transport block size and a modulation and coding scheme and the like) and a resource block to be allocated.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control signal (an RRC message) for various types of setting is transmitted. The RRC layer controls the logical channel, the transport channel, and the physical channel in response to establishment, re-establishment, and release of a radio bearer. When there is an RRC connection between the RRC of the UE 100 and the RRC of the eNB 200, the UE 100 is in a connected state, and when there is no RRC connection, the UE 100 is in an idle state.

A NAS (Non-Access Stratum) layer positioned above the RRC layer performs session management, mobility management and the like.

Figure 5:
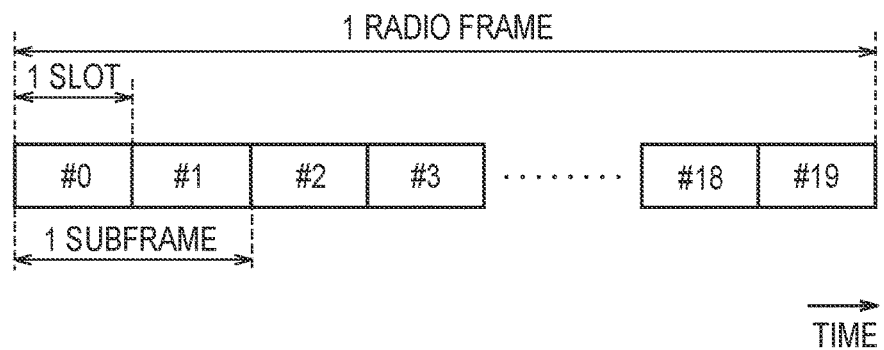
FIG. 5 is a configuration diagram of a radio frame used in the LTE system.

FIG. 5 is a configuration diagram of a radio frame used in the LTE system. In the LTE system, OFDMA (Orthogonal Frequency Division Multiple Access) is used to a downlink, and SC-FDMA (Single Carrier Frequency Division Multiple Access) is used to an uplink, respectively.

As shown in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. At a head of each symbol, a guard interval called a cyclic prefix (CP) is provided. The resource block includes a plurality of subcarriers in the frequency direction. A radio resource unit composed of one subcarrier and one symbol is called a resource element (RE).

Among radio resources allocated to the UE 100, a frequency resource can be specified by a resource block and a time resource can be specified by a subframe (or slot).

In the downlink, an interval of several symbols at the head of each subframe is a control region mainly used as a physical downlink control channel (PDCCH) f. Further, the other interval of each subframe is a region available mainly used as a physical downlink shared channel (PDSCH). In addition, cell-specific reference signals (CRS) are distributed and arranged in each subframe.

In the uplink, both ends in the frequency direction of each subframe are control regions mainly used as a physical uplink control channel (PUCCH). Further, the central portion in the frequency direction of each subframe is a region mainly capable of being mainly used as a physical uplink shared channel (PUSCH). In addition, a demodulation reference signal (DMRS) and a sounding reference signal (SRS) are arranged in each subframe.

(Energy Saving Mode)

Next, an energy saving mode will be described. The energy saving mode is a mode in which consumed power is reduced by stopping the use of at least a part of radio resources, and the eNB 200 is applied to the energy saving mode. In the present embodiment, a plurality of kinds of energy saving modes with different methods for reducing consumed power in the eNB 200 are defined.

The kinds of energy saving modes include "discontinuous transmission (DTX: Discontinuous Transmission)", "reduction in transmission antennas (ANT reduced)", "reduction in communication capacity (Capacity reduced)", and the like.

Discontinuous transmission is an energy saving mode in which the eNB 200 discontinuously transmits a radio signal. The eNB 200 discontinuously transmits a cell-specific reference signal (CRS). For example, the CRS is transmitted per five subframes. The eNB 200 sets a transmission stop period (DTX period) in a period (subframe) in which transmission of CRS is not performed. Thus, the eNB 200 stops the use of radio resources in the transmission stop period. In the transmission stop period, power stops being supplied to the transmitter 211 (in particular, the power amplifier) in the eNB 200, thereby realizing energy saving.

Reduction in the number of transmission antennas is an energy saving mode of reducing the number of antennas used by the eNB 200 for transmitting a radio signal (which will be called "the number of used antennas" below). The eNB 200 transmits a radio signal by use of only some of the antennas 201. For example, the eNB 200 managing a plurality of cells stops using the antenna 201 corresponding to a predetermined cell among the plurality of cells. As a result, the eNB 200 stops using the radio resources used in the predetermined cell. The number of used antennas is reduced so that consumed power in the eNB 200 (in particular, the transmitter 211) is reduced, thereby realizing energy saving.

Reduction in communication capacity is an energy saving mode in which the amount of radio resources that the eNB 200 can allocate is restricted. As a result, the eNB 200 stops using the radio resources that has become unallocatable. By performing such restriction, since the consumed power of the eNB 200 (in particular, the processor 240) is reduced, energy saving of the eNB 200 can be realized.

(Resource Information)

Next, resource information will be described. The resource information is information indicating the usage status of radio resources of the eNB 200. For example, the resource information is a resource status update message (Resource Status Update).

Here, the resource information transmitted from the eNB 200 to which the energy saving mode is applied includes identification information for identifying whether or not the usage status indicated by the resource information is a usage status of radio resources available when the energy saving mode is applied.

For example, when the identification information indicates that the energy saving mode is applied (in the eNB 200 as the transmission source of the resource information), the resource information including the identification information may indicate a usage status of radio resources available when the energy saving mode is applied. On the other hand, when the identification information indicates that the energy saving mode is not applied (in the eNB 200 as the transmission source of the resource information), the resource information including the identification information may indicate an usage status of usual radio resources (that is, an usage status of radio resources available when the energy saving mode is not applied).

Alternatively, when the identification information indicates that the eNB 200 which is the transmission source of the resource information can increase a capacity (that is, the available radio resources), the resource information including the identification information may indicate an usage status of radio resources available when the energy saving mode is applied. When the identification information indicates that the eNB 200 which is the transmission source of the resource information cannot increase the capacity, the resource information including the identification information may indicate an usage status of radio resources available when the energy saving mode is not applied.

In addition, the resource information may include, for example, the following information to indicate the usage status of radio resources.

Specifically, the resource information can include an usage rate of the physical resource block. The usage rate of the physical resource block (PRB (Physical Resource Block) usage rate) is calculated separately for each of the downlink and the uplink, and is defined by the following equation.

$$M(T) = (M1(T)/P(T)) * 100$$

The M(T) is the PRB usage rate, which is the proportion of the PRB used on average during a period T. The range value is 0 to 100%. The M1(T) is the number of PRBs (actually used) for the eNB 200 or the UE 100 during the period T, includes all PRBs used for the transmission of the eNB 200 in the downlink, and includes all PRBs allocated for the transmission of the UEs 200 in the uplink. The P(T) is the total number of PRBs available during the period T. The T is a period during which PRB measurement (count) is executed.

Here, in order to calculate the M(T) when the energy saving mode is applied, the eNB 200 can use the following method.

First, there is a method in which the eNB 200 does not count the unavailable PRBs when the energy saving mode is applied, to the total number of the P(T). That is, the M(T) is calculated except the unavailable PRBs when the energy saving mode is applied. In this case, the identification information included in the resource information indicates, for example, that the eNB 200 which is the transmission source of the resource information can increase the capacity. That is, the usage status of radio resources indicated by the resource information is a usage status of radio resources available when the energy saving mode is applied.

Secondly, there is a method in which the eNB 200 counts the unavailable PRBs when the energy saving mode is applied, to the total number of the P(T). That is, the M(T) is the same value irrespective of whether or not the energy saving mode is applied. In this case, the identification information included in the resource information indicates, for example, that the eNB 200 which is the transmission source of the resource information cannot increase the capacity. That is, the usage status of the radio resources indicated by the resource information indicates an usage status of the usual radio resources.

Thirdly, the eNB 200 counts the P(T) depending on the implementation. In this case, the identification information included in the resource information is implementation dependent.

In addition, the resource information may include a cell capacity class value (Cell Capacity Class Value). The cell capacity class value is a value obtained by classifying each cell depending on radio resources available in each cell managed by the eNB 200 being a source of the resource information. The cell capacity class value is expressed as an integer ranging from 1 to 100. The cell capacity class value of "1" indicates the minimum cell capacity, and the cell capacity class value of "100" indicates the maximum cell capacity. When the resource information includes a usual cell capacity class value, the identification information included in the resource information indicates, for example, that the eNB 200 which is the transmission source of the resource information cannot increase the capacity.

On the other hand, the resource information may include a value (hereinafter referred to as a "a corrected cell capacity class value") obtained by correcting a usual cell capacity class value depending on the amount of radio resources available when the energy saving mode is applied, instead of the usual cell capacity class value. The corrected cell capacity class value can be calculated by an equation "(corrected cell capacity class value)=(cell capacity class value)* ((amount of radio resources available when the energy saving mode is applied)/(amount of usual radio resources))". Further, the amount of usual radio resources is an amount of usual radio resources available when the energy saving mode is not applied.

Further, the eNB 200 may always transmit the resource information including the corrected capacity class value to the neighboring eNB 200. Thereby, when optimizing the load balance between the base stations, the neighboring eNB 200 can take into consideration the usage status of the radio resources of the eNB 200 to which the energy saving mode is applied. Further, when the resource information includes the corrected capacity value, the identification information included in the resource information indicates, for example, that the eNB 200 which is the transmission source of the resource information can increase the capacity.

Further, the resource information may include information on a capacity value (Capacity Value). The capacity value is the ratio of the available radio resource amount to the total radio resource amount ((available radio resource amount)/(total radio resource amount)), and indicates the ratio of free radio resources in the eNB 200. The total radio resource amount is the total radio resource amount used in the E-UTRAN. The available radio resources amount is an amount of usual radio resources available when the energy saving mode is not applied. The capacity value is expressed as an integer ranging from 0 to 100. The capacity value of "0" indicates that no capacity is available, and the capacity value of "100" indicates that the available capacity is the maximum. Further, when the resource information includes a usual capacity value, the identification information included in the resource information indicates, for example, that the eNB 200 which is the transmission source of the resource information cannot increase the capacity.

On the other hand, the resource information may include a value (a corrected capacity value) obtained by correcting a usual capacity value depending on the amount of radio resources available when the energy saving mode is applied, instead of the usual capacity value. The corrected capacity value can be calculated by "(corrected capacity value)= (capacity value)*((the amount of radio resources available when the energy saving mode is applied)/(total radio resource amount)".

Further, when the resource information includes the corrected capacity value, the identification information included in the resource information indicates, for example, that the eNB 200 which is the transmission source of the resource information can increase the capacity.

(Operation According to the First Embodiment)

Figure 6:
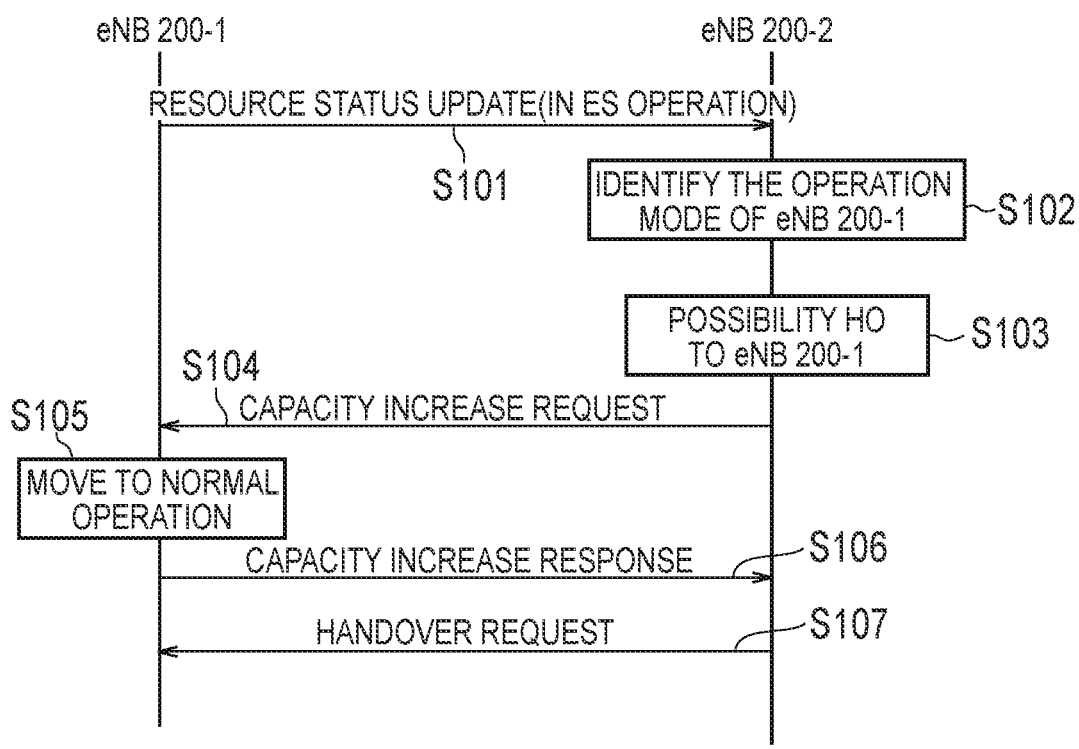
FIG. 6 is a sequence diagram for illustrating an operation according to the first embodiment.

Next, the operation according to the present embodiment will be described with reference to FIG. 6. FIG. 6 is a sequence diagram for illustrating an operation according to the first embodiment.

The eNB 200-1 and the eNB 200-2 are in a relationship of neighboring eNBs and are connected via an X2 interface. Here, it is assumed that the energy saving mode is applied to the eNB 200-1.

As shown in FIG. 6, in step S101, the eNB 200-1 transmits a resource status update message (Resource Status Update) to the eNB 200-2. In the present embodiment, the resource status update message indicates the usage status of radio resources available when the energy saving mode is applied, and includes, for example, PRB usage rate calculated excluding PRBs unavailable when the energy saving mode is applied.

Further, in the present embodiment, the resource status update message includes, as identification information, information indicating that the eNB 200 is applying the energy saving mode.

In step S102, the eNB 200-2 that has received the resource status update message identifies the operation mode of the eNB 200-1 that is the transmission source of the resource status update message. Specifically, the eNB 200-2 identifies whether or not the energy saving mode is applied in the eNB 200-1. In the present embodiment, the eNB 200-2 identifies that the energy saving mode is applied in the eNB 200-1, based on the identification information included in the resource status update message.

In step S103, the eNB 200-2 determines whether or not to cause the UE 100 of its own station to perform a handover to the eNB 200-1, taking into consideration the load of the eNB 200-1 and the load of the eNB 200-2. For example, the eNB 200-2 compares the PRB usage rate of its own station with the PRB usage rate of the eNB 200-1 included in the resource status update message. When a value obtained by subtracting the PRB usage rate of the eNB 200-1 from the PRB usage rate of its own station exceeds a first threshold value, the eNB 200-2 determines to cause the UE 100 of its own station to perform the handover to the eNB 200-1. In this case, since the eNB 200-2 determines by use of the PRB usage rate calculated excluding the PRB unavailable when the energy saving mode is applied, it is possible to optimize the load balance between the eNBs while considering the reduction of consumed power.

Alternatively, when the resource status update message indicates the usage status of radio resources available when the energy saving mode is applied, and when the load of the eNB 200-2 exceeds a second threshold value, the eNB 200-2 determines to make the UE 100 of its own station perform a handover to the eNB 200-1. In this case, it is possible to suppress the excessive load of the eNB 200-2.

The eNB 200-2 executes the process of the step S104 when the eNB 200-2 determines to cause the UE 100 of its own to perform the handover to the eNB 200-1 and the energy saving mode is applied in the eNB 200-1, Alternatively, based on a parameter (QCI) indicating the quality of service (QoS) requested by each of all UEs 100 that are to perform the handover, the eNB 200-2 calculates radio resources necessary to satisfy the quality of service requested by each of all UEs 100. If the eNB 200-2 determines that the necessary amount of radio resources exceeds the amount of radio resources available by the eNB 200-1 to which the energy saving mode is applied, based on the information included in the resource status update message, the eNB 200-2 executes the process of step S104, and if not, the eNB 200-2 executes the process of step S107.

In step S104, the eNB 200-2 transmits a capacity increase request message (Capacity Increase Request) for increasing the capacity of the eNB 200-1, to the eNB 200-1. The eNB 200-2 transmits a capacity increase request message when the energy saving mode is applied in the eNB 200-1. The capacity increase request message is a message requesting an increase in available radio resources in the eNB 200-1 to which the energy saving mode is applied. The capacity increase request message may include information on radio resources necessary to satisfy the quality of service requested by each of all the UEs 100 to perform the handover. For example, the information is a necessary radio resource amount. Alternatively, the information may be the information of QCI of each of all the UEs 100 that are to perform the handover.

Alternatively, the eNB 200-2 may transmit a message requesting termination of the application of the energy saving mode, instead of the capacity increase request message.

In step S105, the eNB 200-1 having received the capacity increase request message increases available radio resources based on the capacity increase request message. Specifically, the eNB 200-1 terminates the application of the energy saving mode based on the capacity increase request message.

Alternatively, when the capacity increase request message includes information on radio resources necessary to satisfy the quality of service requested by each of all UEs 100 that is are to perform the handover, the eNB 200-1 may determine whether or not the eNB 200-1 can reserve the necessary radio resources in a state that the energy saving mode is applied, based on the information. The eNB 200-1 may terminate the application of the energy saving mode when the eNB 200-1 cannot reserve the necessary radio resources in the state that the energy saving mode is applied, that is, when the service quality requirement of the UE 100 of a handover candidate from the eNB 200-2. The eNB 200-1 may continue the application of the energy saving mode when the eNB 200-1 can reserve the necessary radio resources in the state that the energy saving mode is applied.

Further, when the eNB 200-1 cannot reserve the necessary radio resources in the state that the energy saving mode is applied, the eNB 200-1 may determine whether or not the eNB 200-1 can reserve the necessary radio resources by changing the type of the energy saving mode, on the basis of the information. For example, when plural types of energy saving modes are applied, the eNB 200-1 can determine whether or not the eNB 200-1 can reserve the necessary radio resources by terminating the application of a part of the energy saving modes. Specifically, when the mode of discontinuous transmission and the mode of reduction in the number of transmission antennas are applied, the eNB 200-1 may terminate only the application of the mode of discontinuous transmission and continue the application of the mode of reduction in the number of transmission antennas.

Alternatively, the eNB 200-1 may determine whether or not the eNB 200-1 can reserve the necessary radio resource amount by reducing the amount of radio resources to be stopped in the energy saving mode (that is, increasing the allowable radio resource amount). Thereby, the eNB 200-1 can reserve the necessary radio resource amount while applying the energy saving mode.

In step S106, the eNB 200-1 transmits a response to the capacity increase request message to the eNB 200-2. The response includes information indicating that the application of the energy saving mode has been terminated (acceptance). Alternatively, the response includes information indicating that the application of the energy saving mode is continued (rejection). Alternatively, the response may include information indicating that the application of the energy saving mode is continued upon reserving the necessary radio resource amount when the handover of the UE 100 from the eNB 200-2 is performed (acceptance).

In step S107, the eNB 200-2 having received the response to acceptance transmits, to the eNB 200-1, a handover request message (Handover Request) for requesting a handover to the eNB 200-1. That is, the eNB 200-2 does not transmit the handover request message until the eNB 200-2 receives the response to the capacity increase request message.

On the other hand, the eNB 200-2 having received the response to rejection starts a consideration as to whether or not the handover to another neighboring eNB can be performed.

Thereafter, the eNB 200-1 and the eNB 200-2 operate according to a normal handover procedure. The UE 100 of the eNB 200-2 performs a handover from the eNB 200-2 to the eNB 200-1.

(Summary of the First Embodiment)

In the present embodiment, the eNB 200-1 to which the energy saving mode is applied transmits, to the eNB 200-2, the resource status update message including the identification information for identifying whether or not the usage status of radio resources indicated by the resource status update message is a usage status of radio resources available when the energy saving mode is applied. As a result, the eNB 200-2 can identify whether or not the usage status of radio resources indicated by the resource status update message is the usage status of radio resources available when the energy saving mode is applied. Therefore, for example, when the identification information indicates the usage status of available radio resources when the energy saving mode is applied, the eNB 200-2 can expect that the load of the eNB 200-1 is not large, even when the usage status of radio resources of the eNB 200-1 is high. As a result, the eNB 200-2 can appropriately determine whether or not the UE 100 of its own station should perform the handover, and the load balance between the eNBs can be appropriately optimized. Therefore, it is possible to appropriately reduce the load on the eNB 200-2.

In addition, in the embodiment, when the energy saving mode is applied to the eNB 200-1, the eNB 200-2 transmits the capacity increase request message for increasing the radio resources available in the eNB 200-1, before causing the UE 100 of its own to perform the handover. Thereby, the eNB 200-1 having received the capacity increase request message can increase the available radio resources before the UE 100 performs the handover from the eNB 200-2. As a result, since the handover procedure is appropriately performed, the communication quality of the UE 100 that performs the handover can be secured.

Further, in the embodiment, the capacity increase request message includes information on radio resources necessary to satisfy the service quality requested by each of all the UEs 100 that perform the handover. Thereby, the eNB 200-1 can continue the application of the energy saving mode when the necessary radio resource amount can be reserved in the state that the energy saving mode is applied. As a result, it is possible to reduce the consumed power of the eNB 200-1 while optimizing the load balance between the eNBs.

Further, in the embodiment, when the usage status of radio resources indicated by the resource information is the usage status of radio resources available when the energy saving mode is applied, the resource information includes the PRB usage rate calculated excluding PRBs unavailable when the energy saving mode is applied, the corrected cell capacity class value, the corrected capacity value, and the like. By the resource information indicating the usage status of radio resources available when the energy saving mode is applied, the eNB 200-2 can optimize the load balance between the eNBs while considering the reduction of the power consumption.

Second Embodiment

Next, a modification according to the second embodiment will be described. In the first embodiment, the resource information is information indicating the usage status of radio resources of the eNB 200. In the second embodiment, the resource information is information indicating the usage status of the radio resources of the AP 400. It should be noted that the description of the same parts as in the first embodiment will be omitted as appropriate.

Figure 7:
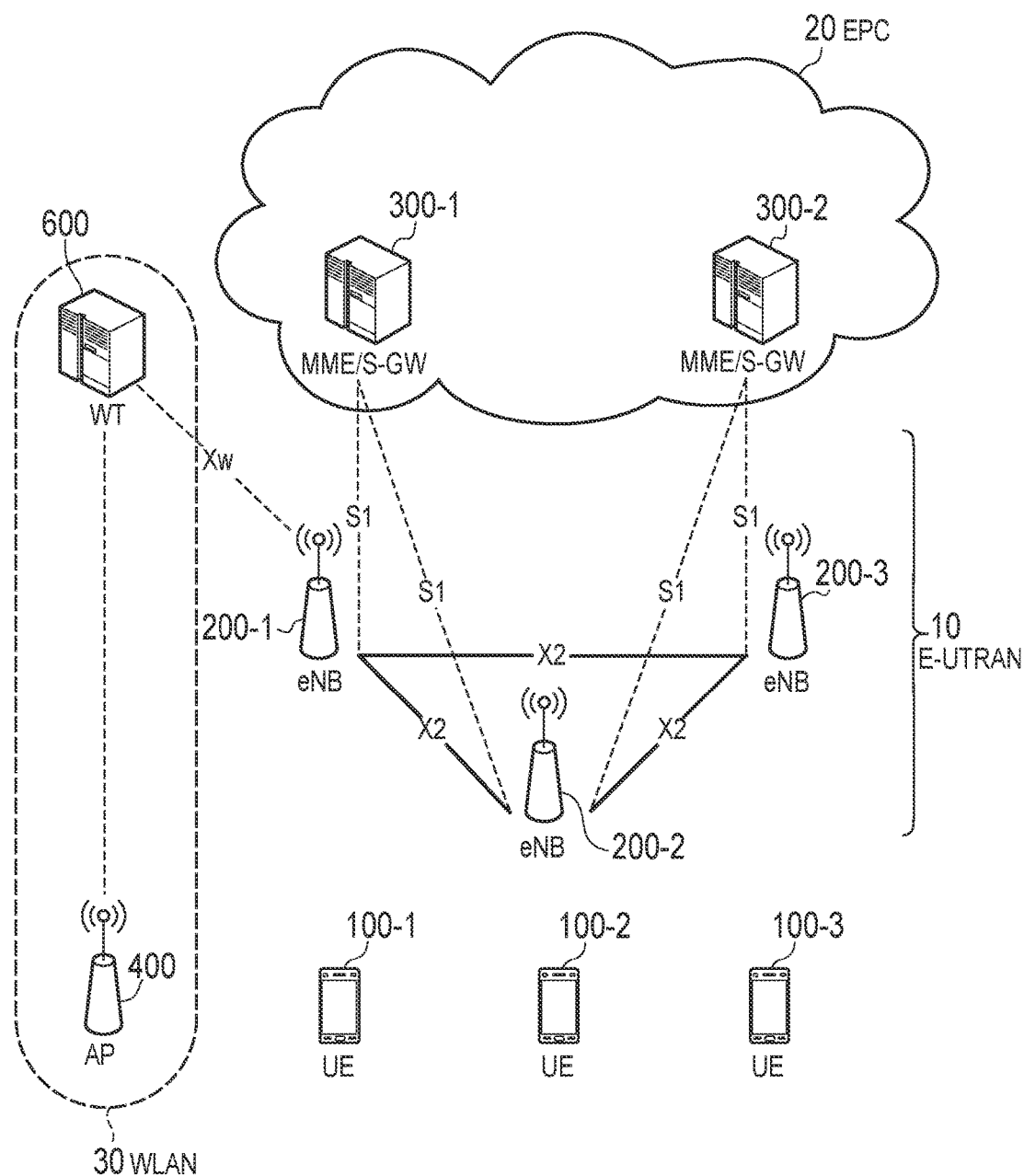
FIG. 7 is a configuration diagram of a LTE system according to a second embodiment.

(System Configuration) The system configuration will be described with reference to FIG. 7. FIG. 7 is a configuration diagram of a LTE system according to the embodiment. As shown in FIG. 7, the system according to the present embodiment is constituted by a LTE system and a WLAN system (WLAN 30).

The WLAN 30 comprises a WLAN access point (hereinafter referred to as "AP") 400 and a WLAN termination apparatus (hereinafter referred to as "WT") 600. The AP 400 is, for example, an AP (Operator controlled AP) managed by an NW operator of the LTE system. The WT 600 is a node in the WLAN and is connected to the eNB 200 via the Xw interface. The WT 600 manages one or more APs 400. The WT 600 can send the information of the AP 400 managed by the WT 600 to the eNB 200. Also, the WT 600 can send the information received from the eNB 200 to the AP 400 managed by the WT 600 itself.

Further the Xw interface is a logical interface between the 3GPP RAN and the WLAN. The Xw interface terminates at the eNB 200 on the LTE (3 GPR RAN) side, and terminates at the WT 600 at the WLAN side. In FIG. 7, the Xw interface is an interface directly connecting the eNB 200 and the WT 600, but may be an interface via the MME/S-GW 300 and the P-GW.

The WLAN 30 is configured to comply with standards of IEEE 802.11, for example. The AP 400 performs WLAN communication with the UE 100 in a frequency band different from a cellular frequency band. Generally, the WLAN communication is performed in an unlicensed band. Cellular communication is performed in a licensed band. The AP 400 is connected to the EPC 20 via a router or the like.

In addition, the EPC 20 further includes an ANDSF (Access Network Discovery and Selection Function) server. The ANDSF server manages ANDSF information on the WLAN 30. The ANDSF server provides the UE 100 with the ANDSF information on the WLAN 30.

(Wireless LAN Access Point)

Figure 8:
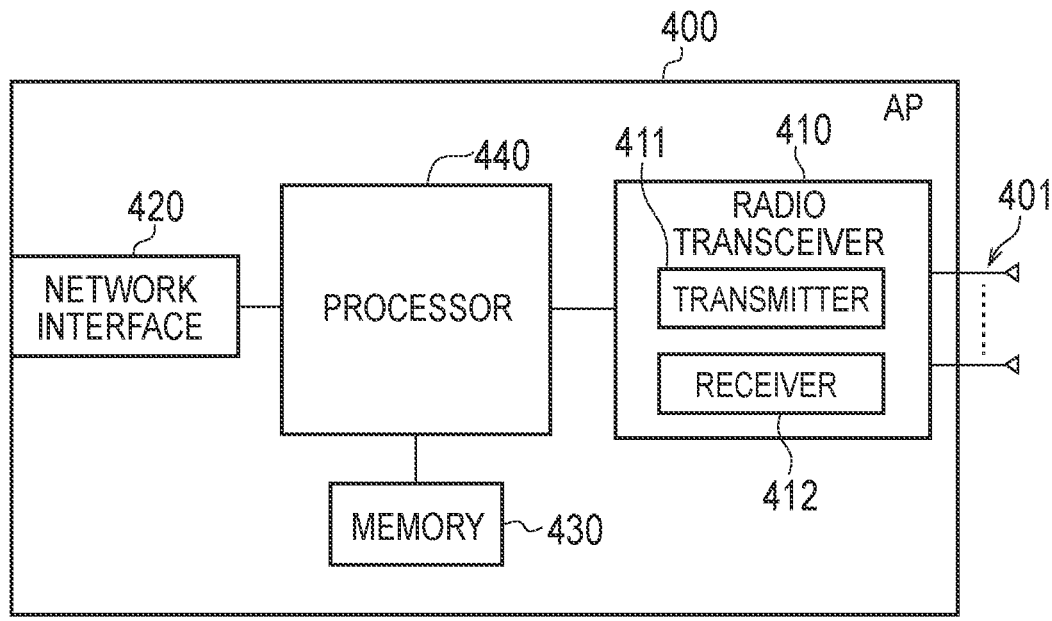
FIG. 8 is a block diagram of an AP.

Next, the configuration of the AP 400 (wireless LAN access point) will be described with reference to FIG. 8. FIG. 3 is a block diagram of the AP 400. As shown in FIG. 8, the AP 400 includes a plurality of antennas 401, a radio transceiver 410, a network interface 420, a memory 430, and a processor 440. The memory 430 and the processor 440 configure a controller. It is noted that the memory 430 may be integrally formed with the processor 440, and this set (that is, a chipset) may be called a processor constituting a controller.

The plurality of antennas 401 and the radio transceiver 410 are used to transmit and receive a radio signal. The radio transceiver 410 includes a transmission unit (a transmitter) 411 configured to convert the baseband signal output from the processor 440 into the radio signal, and transmit the radio signal from the plurality of antennas 401. Further, the radio transceiver 410 includes a reception unit (a receiver) 412 configured to convert the radio signal received by the plurality of antennas 401 into the baseband signal, and outputs the baseband signal to the processor 440.

The network interface 420 is connected to the backhaul via a predetermined interface. Further, the network interface 420 is connected to the WT 600, and is used in communication with the eNB 200, and the like via the WT 600.

The memory 430 stores a program to be executed by the processor 440 and information to be used for a process by the processor 440.

The processor 440 includes the baseband processor that performs modulation and demodulation, encoding and decoding and the like on the baseband signal and a CPU that performs various processes by executing the program stored in the memory 430. The processor 440 executes various processes and various communication protocols described later.

(Wireless LAN Termination Apparatus)

Figure 9:
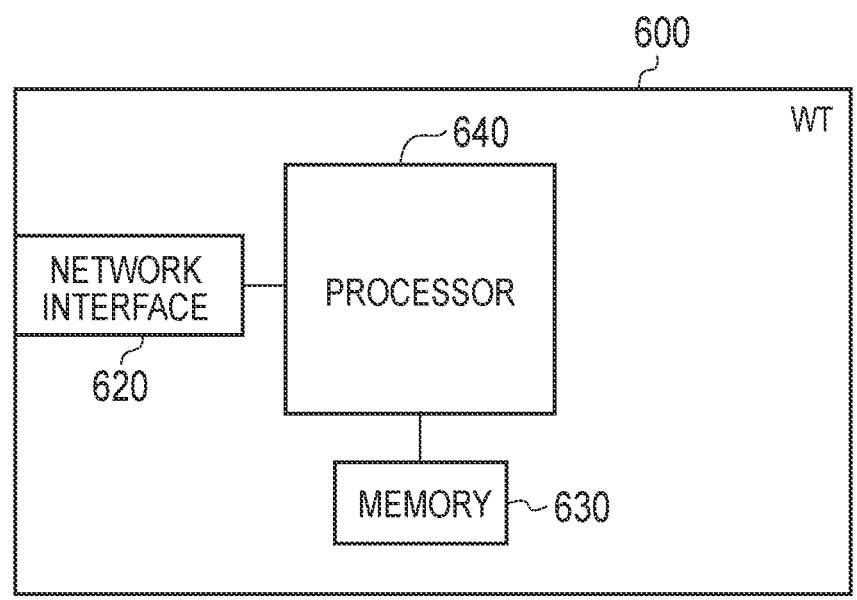
FIG. 9 is a block diagram of a WT.

In the following, the configuration of the WT 600 (wireless LAN termination apparatus) will be described with reference to FIG. 9. FIG. 9 is a block diagram of the WT 600. As shown in FIG. 9, the WT 600 includes a network interface 620, a memory 630, and a processor 640. The memory 630 and the processor 640 configure a controller. It is noted that the memory 630 may be integrally formed with the processor 640, and this set (that is, a chipset) may be called a processor constituting a controller.

The network interface 640 is connected to the backhaul via a predetermined interface. Further, the network interface 620 is connected to the AP 400, and is used in communication with the AP 400, and the like. Further, the network interface 620 is connected to the AP 400 via the Xw interface. The network interface 620 is used in communication on the Xw interface, and the like. Further, the network interface 220 of the eNB 200 is connected to the WT 600 via the Xw interface. The network interface 220 is used for communication on the Xw interface.

The memory 630 stores a program to be executed by the processor 640 and information to be used for a process by the processor 640.

The processor 640 includes the baseband processor that performs modulation and demodulation, encoding and decoding and the like on the baseband signal and a CPU that performs various processes by executing the program stored in the memory 630. The processor 640 executes various processes and various communication protocols described later.

(Operation According to the Second Embodiment)

Figure 10:
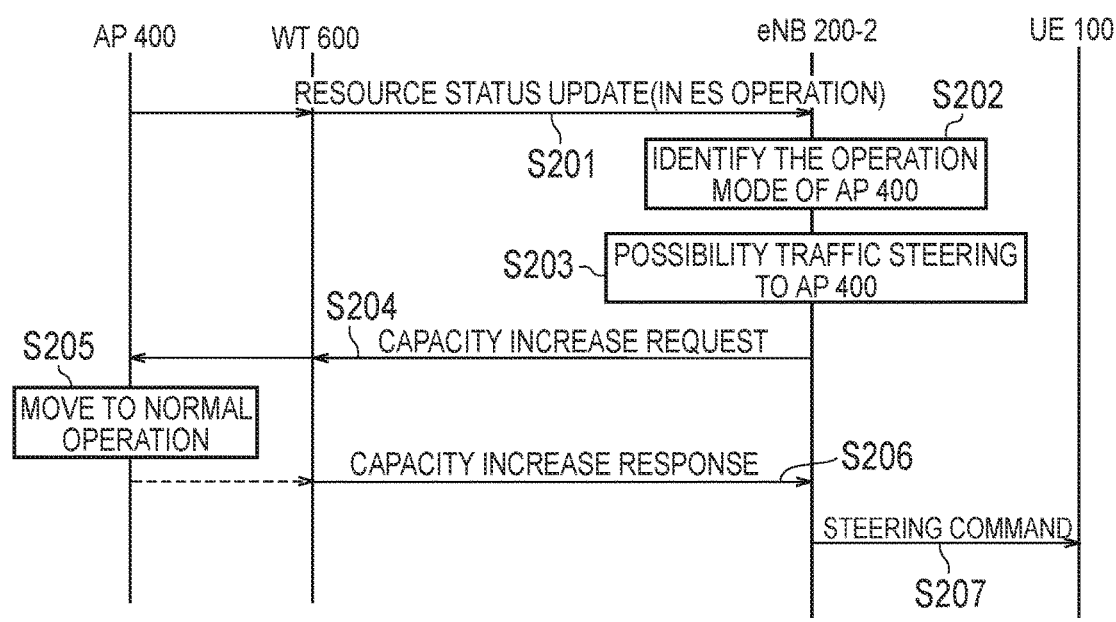
FIG. 10 is a sequence diagram for illustrating an operation according to the second embodiment.

Next, the operation according to the second embodiment will be described with reference to FIG. 10. FIG. 10 is a sequence diagram for illustrating an operation according to the second embodiment.

In FIG. 10, the AP 400 is managed by the WT 600. In addition, the AP 400 is located in the cell managed by the eNB 200-2. The coverage of the AP 400 may overlap at least partly with the coverage of the cell managed by the eNB 200. Here, it is assumed that the energy saving mode is applied to the AP 400.

In step S201, the AP 400 transmits a resource state update message to the eNB 200-2 via the WT 600. The resource state update message is the same information as in the first embodiment. The resource state update message includes information indicating that the AP 400 is applying the energy saving mode, as the identification information.

The WT 600 may transmit the resource state update message to the eNB 200-2 according to the determination of the WT 600 when the WT 600 manages the resource state of the AP 400. The WT 600 may transmit to the eNB 200-2 a message including information indicating the resource status of the plurality of APs 400 (for example, a predetermined group constituted by the plurality of APs 400), when the WT 600 manages the plurality of APs 400.

In step 202, the eNB 200-2 having received the resource state update message identifies an operation mode of the AP 400. In the present embodiment, the eNB 200-2 identifies that the energy saving mode is applied in the AP 400, on the basis of the identification information included in the resource status update message.

In step S203, the eNB 200-2 determines whether or not to switch the traffic of the UE 100 of its own station to the WLAN 30 (AP 400) in consideration of the load of the AP 400 and the load of the eNB 200-2. The eNB 200-2 may determine whether or not to switch the traffic of the UE 100 of its own station to the WLAN 30 (AP 400), taking into consideration the comprehensive load (for example, the average load) of the plurality of APs 400 (for example, predetermined groups). The eNB 200-2 may determine the traffic switching considering the load (only) of the eNB 200-2 the AP 400 is applying the energy saving mode.

In step S204, the eNB 200-2 transmits, to the WT 600, a capacity increase request message for increasing the capacity of the AP 400. The WT 600 may transmit, to the WT 600, a message requesting termination of the application of the energy saving mode, instead of the capacity increase request message. The eNB 200-2 may transmit, to the WT 600, a capacity increase request message for increasing the capacity of a plurality of APs 400 (for example, predetermined groups constituted by the plurality of APs 400).

In response to the reception of the capacity increase request message, the WT 600 may forward the capacity increase request message to the AP 400 or may newly transmit, to the AP 400, a message requesting the termination of the application of the energy saving mode.

In step S205, the AP 400 having received the capacity increase request message (or the message requesting termination of the application of the energy saving mode) increases the available radio resources. For example, the AP 400 terminates the application of the energy saving mode based on the capacity increase request message.

In step S206, the WT 600 transmits a response to the capacity increase request message to the eNB 200-2. The response includes information indicating that the application of the energy saving mode has been terminated (acceptance). The response may include information indicating that the application of the energy saving mode is continued (rejection).

The WT 600 may transmits a response to the capacity increase request message to the eNB 200-2 in response to reception of a response from the AP 400 after transmitting, to the AP 400, the capacity increase request message (or the message requesting termination of the application of the energy saving mode). The WT 600 may forward the response from the AP 400 to the eNB 200-2. Further, the WT 600 may transmit a response to the capacity increase request message to the eNB 200-2 in response to reception of a response (for example, an acknowledgment (ACK)) from the AP 400. Alternatively, the WT 600 may transmit the response to the capacity increase request message to the eNB 200-2, regardless of the response from the AP 400, after transmitting the capacity increase request message (or a message requesting termination of application of the energy saving mode). For example, the WT 600 may transmit a response to the capacity increase request message to the eNB 200-2 before receiving a response from the AP 400 if the message transmitted to the AP 400 is a forced instruction (command).

In step S207, the eNB 200-2 having received the response of acceptance can transmit, to the UE 100, an instruction (steering command) for switching the traffic of the UE 100 of its own station to the WLAN 30 (AP 400). The eNB 200-2 can determine the UE 100 to which the instruction is transmitted, on the basis of a measurement report on detection (discovery) of the AP 400 received from the UE 100. The measurement report may include reception signal strength (RSRP) of which a radio signal (beacon signal) received from the AP 400 by the UE 100, received signal quality (RSRQ), reception time, and the like, in addition to the identification information (SSID, BSSID, ESSID, HESSID, etc.) of the AP 400 detected by the UE 100, On the other hand, the eNB 200-2 having received the response of rejection may determine whether or not to switch the traffic of the UE 100 of its own station to the WLAN 30 (another AP 400), by considering the resource state of another AP 400 (or another group constituted by the APs). In addition, the eNB 200-2 may start to consider whether or not the handover to another neighboring eNB can be performed (see the first embodiment).

(Summary of the Second Embodiment)

In the present embodiment, the AP 400 to which the energy saving mode is applied (or the T 600 managing the AP 400) transmits, to the eNB 200-2, the resource status update message including the identification information for identifying whether or not the usage status of radio resources of the AP 400 indicated by the resource status update message is a usage status of radio resources available when the energy saving mode is applied to the AP 400. Therefore, for example, when the identification information indicates the usage status of available radio resources when the energy saving mode is applied, the eNB 200-2 can expect that the load of the AP 400 is not large, even when the usage status of radio resources of the AP 400 is high. As a result, the eNB 200-2 can appropriately determine whether or not the UE 100 of its own station should switch the traffic of the UE 100 of its own station to the WLAN 30. Therefore, it is possible to appropriately reduce the load on the eNB 200-2.

Other Embodiment

In the above-described first embodiment, the eNB 200-1 to which the energy saving mode is applied transmits the resource information (resource status update message) including the identification information, but it is not limited to this. The eNB 200-1 to which the energy saving mode is not applied may transmit the resource information including the identification information. In this case, the identification information indicates the usual radio resource usage status. The same applies to the second embodiment.

In addition, the eNB 200-1 to which the energy saving mode is applied may transmit resource information including identification information indicating the usage status of usual radio resources, together with information indicating the usual radio resource usage status. In this case, the resource information may further include information indicating that the energy saving mode is applied in the eNB 200-1. The same applies to the second embodiment.

Alternatively, when the eNB 200-1 to which the energy saving mode is applied may transmit resource information including both information indicating the usual radio resource usage status (for example, capacity value) and information indicating the usage status of radio resources available when the energy saving mode is applied (for example, a corrected capacity value). In this case, the resource information may include identification information associated with each information. The same applies to the second embodiment.

In the above-described second embodiment, the WT 600 may be, for example, an AC (access controller) that manages (controls) the AP 300. The WT 600 may be a network apparatus being an upper node of the AC and managing the AC. In addition, an entity existing inside the AP 400 may have the same function as the WT 600. Therefore, the AP 400 may perform the same operation as the WT 600.

Although an example of applying the contents according to the present application to the LTE system has been described in the above-described each embodiment, the contents is not limited to the LTE system, and the contents according to the present application may be applied to a system other than the LTE system.

In addition, the entire content of JP Patent Application No. 2014-170816 (filed on Aug. 25, 2014) is incorporated in the present specification by reference.

The invention claimed is:

1. A base station in an Evolved-Universal Terrestrial Radio Access Network (E-UTRAN), comprising:
 a controller, wherein
 the controller is configured to:
   receive information from a termination apparatus in a Wireless Local Area Network (WLAN), the termination apparatus managing at least one WLAN access point, the information indicating that an access point managed by the termination apparatus is in an energy savings mode;
   transmit a request message to the termination apparatus upon determining to switch a traffic of a user terminal of the base station to the access point, the request message requesting termination of the energy savings mode to the access point;
   receive a response message to the request message from the termination apparatus; and
   transmit, to the user terminal, an instruction to use the WLAN, in response to the response message indicating that the termination apparatus accepts the request, wherein the user terminal uses the WLAN in response to receiving the instruction.

2. The base station according to claim 1, wherein
 the controller is further configured to hand over the user terminal to a neighbor base station in response to the response message indicating that the termination apparatus rejects the request.

3. A processor for controlling a base station in an Evolved-Universal Terrestrial Radio Access Network (E-UTRAN), configured to:
 receive information from a termination apparatus in a Wireless Local Area Network (WLAN), the termination apparatus managing at least one WLAN access point, the information indicating an access point in which an amount of available radio resources is restricted due to the access point being in an energy savings mode;
 transmit a request message to the termination apparatus upon determining to switch a traffic of a user terminal of the base station to the access point, the request message requesting termination of the energy savings mode to the access point;
 receive a response message to the request message from the termination apparatus; and
 transmit, to the user terminal, an instruction to use the WLAN, in response to the response message indicating that the termination apparatus accepts the request, wherein the user terminal uses the WLAN in response to receiving the instruction.

4. A termination apparatus in a Wireless Local Area Network (WLAN), comprising:
 a controller, wherein
 the controller is configured to:
   transmit, to a base station in an Evolved-Universal Terrestrial Radio Access Network (E-UTRAN), information indicating that an access point managed by the termination apparatus is in an energy savings mode;
   receive a request message from the base station, the request message requesting termination of the energy savings mode to the access point; and
   transmit a response message to the request message, to the base station, wherein in a case that the response message indicates that the termination apparatus accepts the request, the base station transmits an instruction to use the WLAN to the user terminal and the user terminal uses the WLAN in response to receiving the instruction.

* * * * *